United States Patent
Jeong et al.

(10) Patent No.: US 9,165,208 B1
(45) Date of Patent: Oct. 20, 2015

(54) ROBUST GROUND-PLANE HOMOGRAPHY ESTIMATION USING ADAPTIVE FEATURE SELECTION

(71) Applicant: HRL Laboratories, LLC, Malibu, CA (US)

(72) Inventors: Changsoo S. Jeong, Rancho Palos, CA (US); Kyungnam Kim, Oak Park, CA (US); Yang Chen, Westlake Village, CA (US); Deepak Khosla, Camarillo, CA (US); Shinko Y. Cheng, Cupertino, CA (US); Lei Zhang, Torrance, CA (US); Alexander L. Honda, Sunnyvale, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/203,470

(22) Filed: Mar. 10, 2014

Related U.S. Application Data

(60) Provisional application No. 61/779,989, filed on Mar. 13, 2013.

(51) Int. Cl.
*G06K 9/46* (2006.01)
*G06K 9/66* (2006.01)

(52) U.S. Cl.
CPC .................. *G06K 9/4604* (2013.01)

(58) Field of Classification Search
CPC .................................................. G06K 9/4604
USPC ......................................... 382/103, 173, 190
See application file for complete search history.

(56) References Cited

U.S. PATENT DOCUMENTS

| | | | |
|---|---|---|---|
| 8,749,630 B2 * | 6/2014 | Alahi et al. ................... | 348/143 |
| 2010/0014709 A1 * | 1/2010 | Wheeler et al. ............... | 382/103 |
| 2010/0283633 A1 * | 11/2010 | Becker et al. ............... | 340/932.2 |
| 2010/0316257 A1 * | 12/2010 | Xu et al. ....................... | 382/103 |
| 2011/0279685 A1 * | 11/2011 | Alahi et al. ................... | 348/187 |
| 2012/0154579 A1 * | 6/2012 | Hampapur et al. ........... | 348/143 |

(Continued)

OTHER PUBLICATIONS

Subhabrata Bhattacharya, Haroon Idrees, Imran Saleemi, Saad Ali, and Mubarak Shah, "Moving Object Detection and Tracking in Infrared Aerial Imagery", Machine Vision Beyond Visible Specturm, Augmented Vision and Reality, vol. 1, 2011, Springer series, DOI: 10.1007/978-3-642-11568-4.

(Continued)

*Primary Examiner* — Samir Ahmed
(74) *Attorney, Agent, or Firm* — Tope-McKay & Associates

(57) ABSTRACT

Described is system and method for robust ground-plane homography estimation using adaptive feature selection. The system determines feature correspondences of an image that correspond with at least one moving object in each image in a set of images. Additionally, feature correspondences of the image that correspond with at least one above-ground object are determined in each image. Feature correspondences that correspond with each moving object in each image are excluded, and feature correspondences that correspond with each above-ground object in each image are excluded. Each image is divided into a plurality of sub-regions comprising features correspondences. The number of feature correspondences in each sub-region is limited to a predetermined threshold to ensure that feature correspondences are evenly distributed over each image. Finally, a ground-plane homography estimation between the set of images is generated.

12 Claims, 6 Drawing Sheets

(56) References Cited

U.S. PATENT DOCUMENTS

2012/0206597 A1* 8/2012 Komoto et al. .............. 348/135
2012/0301014 A1* 11/2012 Xiao et al. .................. 382/159
2014/0254875 A1* 9/2014 Alahi et al. .................. 382/103

OTHER PUBLICATIONS

Ondřej Chum, Jií Matas, Josef Kittler, "Locally Optimized RANSAC", Pattern Recognition (2003), pp. 236-243.

Fischler, M.A. and Bolles, R.C. in "Random Sample Consensus: A Paradigm for Model Fitting with Applications to Image Analysis and Automated Cartography," Comm of the ACM, 24: 381-395, 1981.

Kyungnam Kim, Yang Chen, Alexander Honda, Changsoo Jeong, Shinko Cheng, Lei Zhang, Deepak Khosla, "Bio-inspired Algorithms for Target Detection and Classification in Airborne Videos", in Proceedings of AUVSI's Unmanned Systems North America 2012 (AUVSI 2012).

Aniruddha Kembhavi, David Harwood, and Larry S. Davis. Vehicle Detection Using Partial Least Squares. IEEE Trans. Pattern Anal. Mach. Intell. vol. 33, No. 6 (Jun. 2011), 1250-1265.

Paul A. Viola, Michael J. Jones: Robust Real-Time Face Detection. In ICCV 2001: 747.

Yoav Freund and Robert E. Schapire. A decision-theoretic generalization of on-line learning and an application to boosting. In Computational Learning Theory: Eurocolt '95, pp. 23-27, Springer-Verfag, 1995.

Y. LeCun, K. Kavukcuoglu and C. Farabet, "Convolutional Networks and Applications in Vision", in International Symposium on Circuits and Systems (ISCAS'10), IEEE, Pans, 2010.

C. Farabet, B. Martini, B. Corda, P. Akselrod, E. Culurciello and Y. LeCun, "NeuFlow: A Runtime Reconfigurable Dataflow Processor for Vision", in Proc. of the Fifth IEEE Workshop on Embedded Computer Vision (ECV'11 @CVPR'11), IEEE, Colorado Springs, 2011, Invited Paper.

P. F. Felzenszwalb, R. B. Girshick, D. McAllester, and D. Ramanan. Object detection with discriminatively trained part-based models. IEEE Transactions on Pattern Analysis and Machine Intelligence, 32(9):1627-1645, 2009.

* cited by examiner

ROBUST GROUND-PLANE HOMOGRAPHY ESTIMATION USING ADAPTIVE FEATURE SELECTION

CROSS-REFERENCE TO RELATED APPLICATIONS

This is a Non-Provisional patent application of U.S. Provisional Application No. 61/779,989, filed in the United States on Mar. 13, 2013, entitled, "Robust Ground-Plane Homography Estimation Using Adaptive Feature Selection."

GOVERNMENT LICENSE RIGHTS

This invention was made with government support under U.S. Government Contract Number HR0011-10-C-0013 Neovision2. The government has certain rights in the invention.

BACKGROUND OF THE INVENTION (1) Field of Invention

The present invention relates to a system for ground-plane homography estimation and, more particularly, to a system for ground-plane homography estimation using adaptive feature selection.

(2) Description of Related Art

In the field of computer vision and computer graphics, any two images of the same planar surface in space are related by a homography (assuming a pinhole camera model). Homography is a concept in the mathematical science of geometry. A homography is an invertible transformation from a projective space (e.g., the real projective plane) to itself that maps straight lines to straight lines. Through homography mapping, the image coordinate in image A of a physical planar surface point can be mapped to the coordinate in image B of the same point. This has many practical applications, such as image rectification, image registration, or computation of camera motion (rotation and translation) between two images. Once camera rotation and translation have been extracted from an estimated homography matrix, this information may be used for navigation, or to insert models of three-dimensional (3D) objects into an image or video, so that they are rendered with the correct perspective and appear to have been part of the original scene, as in augmented reality.

Conventional homography estimation methods in the prior art use random sample consensus (RANSAC) to find the homography function between two images of the same scene, such as two consecutive images taken by an airborne platform looking down to the wound. RANSAC picks random samples of the given correspondences between them, fits the homography function, and then evaluates the function to all possible correspondences. Evaluation of the fitted homography is a process to find a function that has a maximum number of inliers among all the correspondences. Thus, the conventional ground-plane homography estimation methods assume that the correspondences lie on the planar surface (i.e., the ground plane). If a significant amount of the feature correspondences is from either moving or above-ground objects, the estimated homography may contains errors and inaccuracies, since those outlier correspondences do not hold the ground-homography transform.

The moving object detection and tracking algorithm described by Bhattacharya et al. in "Moving Object Detection and Tracking in Infra-red Aerial Imagery," Machine Vision Beyond Visible Specturm, Augmented Vision and Reality, Volume 1, 2011 (which is hereby incorporated by reference as though fully set forth herein) performs pound-plane homography estimation in forward looking infrared aerial imagery. It uses speeded up robust features (SURF) and Kanade-Lucas-Tomasi (KLT) features to regulate cumulative homography drift, but the algorithm still has the problem of non-planar outlier features.

The locally optimized RANSAC approach described by Chum et al. in Locally Optimized RANSAC," Pattern Recognition (2003), pp. 236-243 (which is hereby incorporated by reference as though fully set forth herein) modified RANSAC so that it simultaneously improves the speed of the algorithm and the quality of the solution by introduction of two local optimization methods, but it didn't actively exclude outlier features for quality improvement.

Each of the prior methods described above exhibit limitations that make them incomplete. Thus, a continuing need exists for a method for robust ground-plane homography estimation using adaptive feature selection, which includes feature exclusion from moving or above-ground objects and a sub-region feature correspondence limitation

SUMMARY OF THE INVENTION

The present invention relates to a system for ground-plane homography estimation and, more particularly, to a system for ground-plane homography estimation using adaptive feature selection. The system comprises one or more processors and a memory having instructions such that when the instructions are executed, the one or more processors perform multiple operations. The system determines feature correspondences that correspond with at least one moving object in each image in a set of images. Additionally, feature correspondences that correspond with at least one above-ground object in each image in the set of images are determined. Feature correspondences that correspond with each moving object in each image in the set of images are excluded as well as feature correspondences that correspond with each above-ground object in each image in the set of images. Each image in the set of images is divided into a plurality of sub-regions comprising feature correspondences. The number of feature correspondences in each sub-region is limited to as predetermined threshold to ensure that feature correspondences are evenly distributed over each image in the set of images. Finally, a ground-plane homography estimation between the set of images is generated.

In another aspect, the number of feature correspondences in each sub-region is limited to an average number of feature correspondences of all sub-regions of the image.

In another aspect, the average number of feature correspondences of all sub-regions of the image, k, is determined according to the following:

$$k = \frac{1}{N}\sum_{i=1}^{l} n_i,$$

where N is equal to the total number of feature correspondences, $n_i$ is the number of feature correspondences on an $i^{th}$ sub-region, 1 is the total number of sub-regions, and $\Sigma$ denotes a summation.

In another aspect, if the ratio of $n_i$ to N is greater than the predetermined threshold, then k feature correspondences are randomly selected from the number of feature correspondences on the $i^{th}$ sub-region for generating the homography estimation between the set of images.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
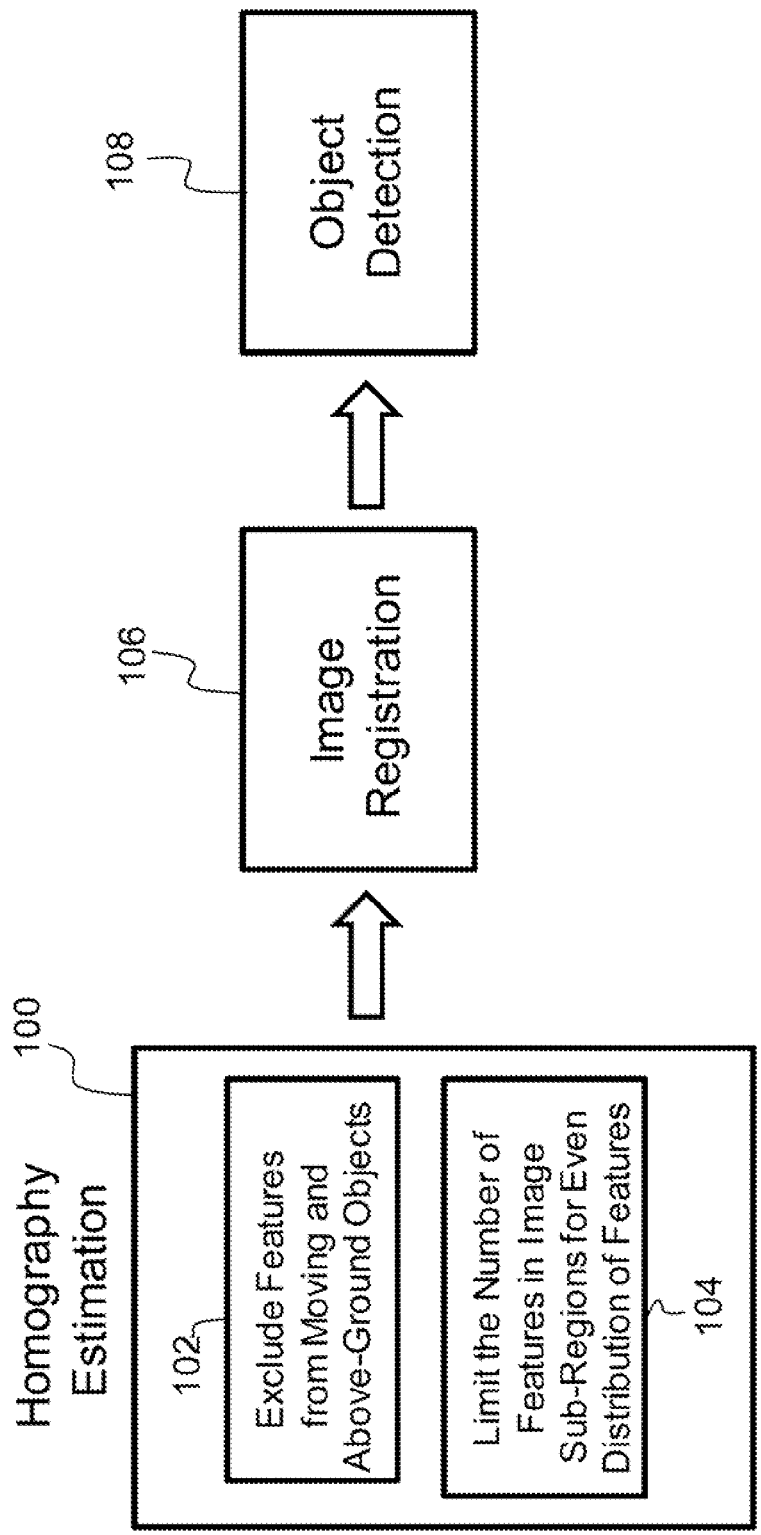
FIG. 1. illustrates a system for robust ground-plane homography estimation using adaptive feature selection according to the principles of present invention.

The present invention relates to a system for ground-plane homography estimation and, more particularly, to a system for ground-plane homography estimation using adaptive feature selection. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act " of in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between. various portions of an object. As such, as the present invention is changed, the above labels may change their orientation.

(1) Principal Aspects

The present invention has three "principal" aspects. The first is a system for ground-plane homography estimation. The sytem is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for ground-plane homography estimation. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(2) Specific Details

The present invention is a system, method, and computer program product for robust ground-plane homography estimation a sing adaptive feature selection methods, including feature exclusion from moving or above-ground objects and a sub-region feature correspondence limitation, which will be described in detail below. The invention described herein is fully applicable to any computer vision problem that involves planar homography estimation, such as stereo matching image registration, or multi-view fusion. While the invention is described in the context of frame-to-frame registration for detecting moving objects on a ground plane in a video taken from a moving platform a detection-by-registration application is only one example of an application for which the invention can be used.

By registering two frames into a reference coordinate system, one can stabilize the video and only detect independently moving objects. In order to establish homography mapping between two images, corresponding features are needed between those two images. FIG. 1 illustrates one application of the system for robust ground-plane homography estimation using adaptive feature selection according to the principles of the present invention. The correspondences on moving or above-ground objects make homography estimation unreliable, Therefore, during homography estimation 100, features from moving and above-ground objects are excluded 102. Additionally, the number of features on the pre-defined sub-regions is limited in order to make sure the feature points are evenly distributed over the image 104. The sub-regions are pre-defined based on input image size in a first stage of image processing. As a non-limiting example, a typical sub-region is 90×60 pixels. Using feature exclusion from moving or above-ground objects (element 102) as well as a sub region correspondences limitation (element 104), homography estimation 100 can be done more robustly. Following homography estimation 100, the process may proceed to image registration 106, and, finally, object detection 108.

The following describes two methods of adaptive feature selection for robust ground-plane homography estimation. As noted above, the described methods are presented in terms of a video surveillance application where moving objects on a ground surface are automatically detected by co-registering video frames taken from an aircraft The estimated homography is the key parameter for image registration. By registering frames into a reference coordinate system, one can stabilize the video (i.e., cancel or compensate the camera's ego-motion) and only detect independently moving objects.

(2.1) Feature Exclusion from Moving and Above-Ground Objects

Many imaging applications, such as image rectification, image registration, and computation of camera motion (rotation and translation), between two images need robust homography estimation. For example, image registration aims for compensation of camera ego motion The image registration step is successful when homography estimation is accurate.

Traditionally, given many feature correspondences on two images, random sample consensus (RANSAC) iteratively calculates and evaluates the best fitting function (i.e., homography function), which is a mapping function between two images of the same planar surface in space. RANSAC is described by Fischler, M.A. and Bolles, R.C. in "Random Sample Consensus: A Paradigm for Model Fitting with Applications to Image Analysis and Automated Cartography," Comm of the ACM, 24:381-395, 1981 (which is hereby incorporated by reference as though fully set forth herein). If most of the feature correspondences lie on planar regions, the estimated tomography can successfully transfer pixels from one image to the other image. Thus, homography estimation is only accurate when the majority of feature correspondences are obtained from the planar regions. However, if there are many feature correspondences on above-ground structures (e.g., trees, buildings) or moving objects (e.g., vehicles on a freeway), then those outlier features affect the final homography function and lead to image registration errors. In the application of object detection in aerial motion imagery, the subsequent detection module after image registration will suffer from inaccurate camera ego motion compensation.

The registration results will be improved if one can correctly exclude the correspondences on moving objects and above-ground structures (depicted as element 102 in FIG. 1). The goal is to find/predict these regions and exclude them based on previous detection results. Assuming camera motion is consistent with the previous frame, the predicted location of an object can be approximated by the homography function or the speed of the moving object from the previous frames. After homography estimation, the correspondences on predicted regions of these objects will be excluded for RANSAC calculation.

Figure 2A:
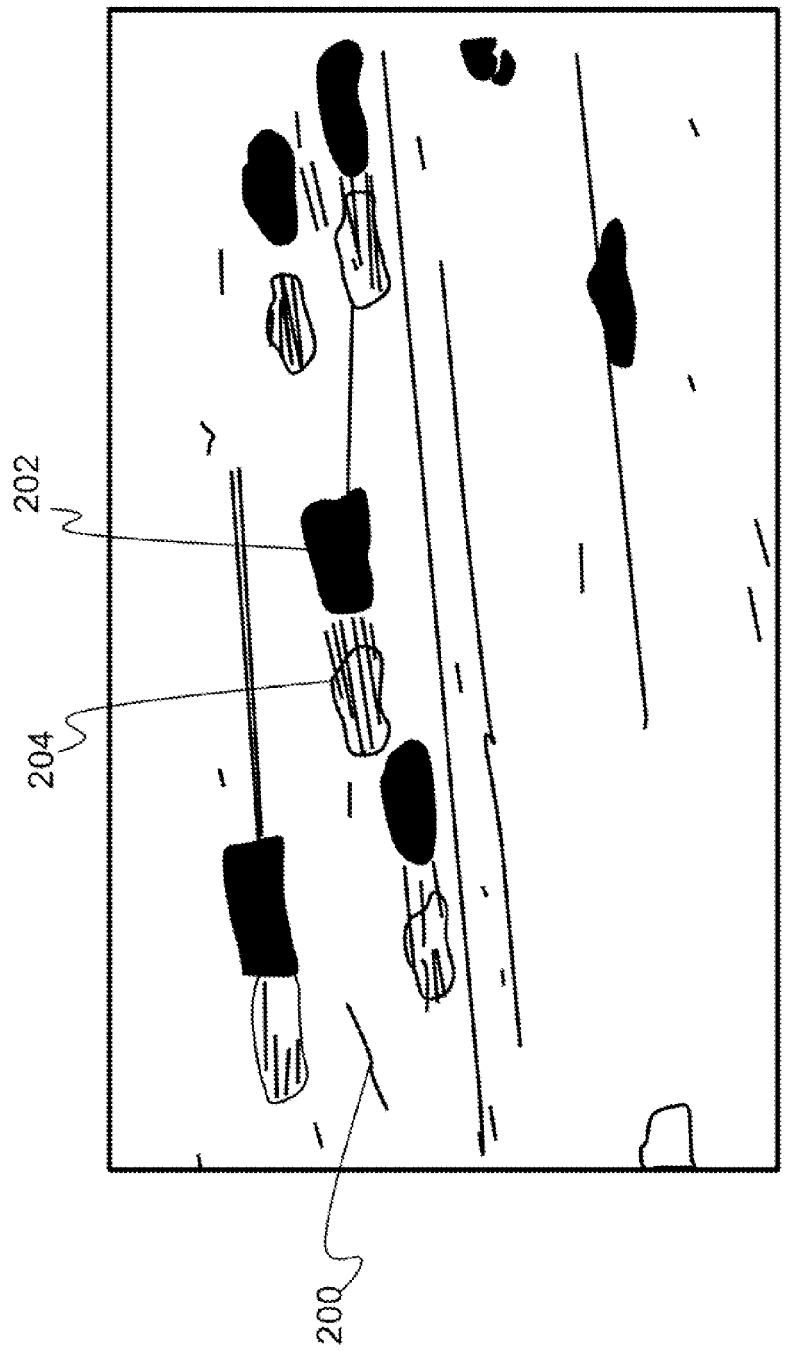
FIG. 2A illustrates feature correspondences after exclusion of moving or above-ground objects when camera motion is from left to right according to the principles of the present invention.
Figure 2B:
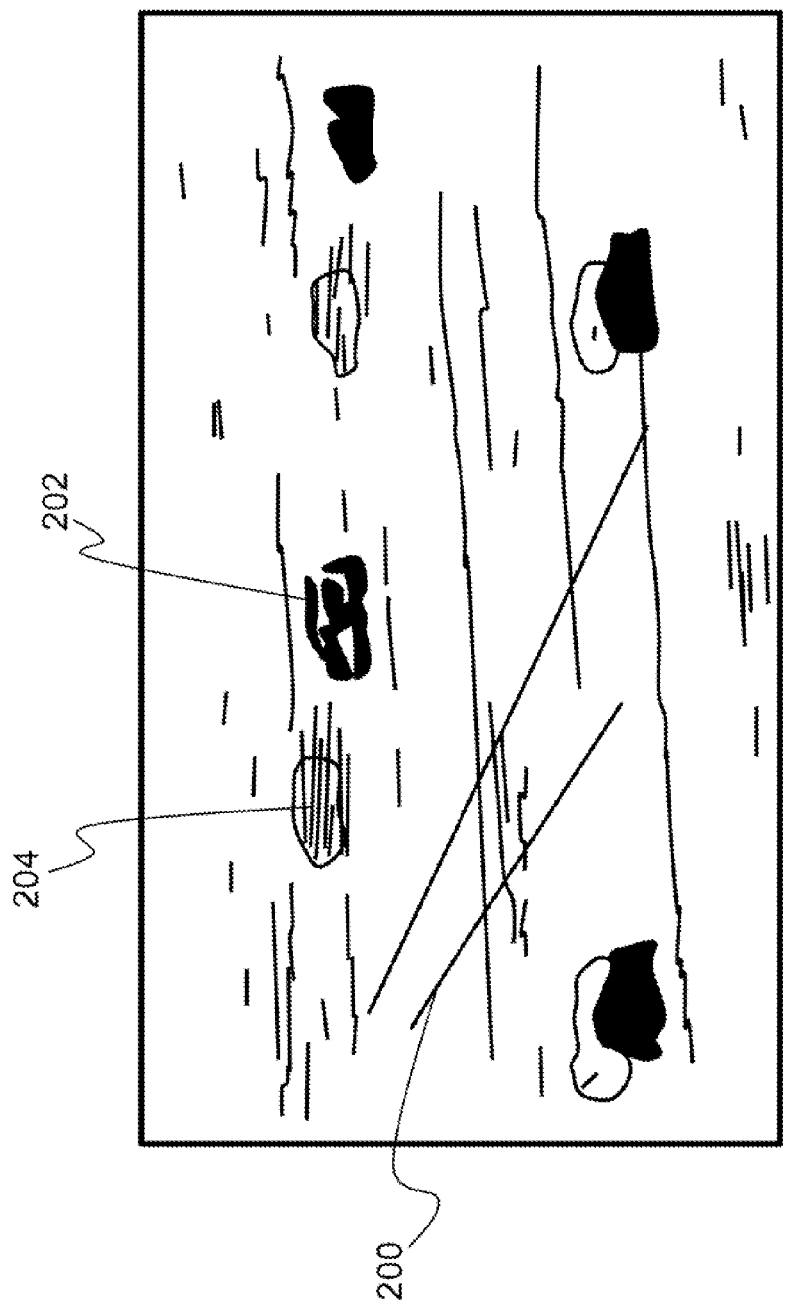
FIG. 2B illustrates feature correspondences after exclusion of moving or above-ground objects when camera motion is from left to right and top to bottom according to the principles of the present invention.

FIGS. 2A and 2B illustrate some outputs of feature exclusion on object regions by estimated detections from the previous frame in scenes depicting cars driving on a freeway, which corresponds to element 102 of FIG. 1. Lines 200 represent correspondence vectors between current and previous frames, filled regions 202 represent the predicted object locations from the previous frame, and. unfilled regions 204 represent the current object location. As shown in FIGS. 2A and 2B, there is no correspondence established between the features on moving objects (e.g., cars) in the current frames (unfilled regions 204) and those in the previous frame (filled regions 202). In FIG. 2A, camera motion is from left to right, while in FIG. 2B, camera motion is from left to right and top to bottom. Without the adaptive feature exclusion of the present invention, most features on the moving objects would be mapped to the corresponding features of the same objects in the previous frame, which breaks the ground-plane homography mapping. The outlier-free (or outlier-less) correspondence according to the principles of the present invention results in more accurate ground-plane homography estimation.

(2.2) Sub-Region Feature Correspondence Limit

Feature correspondences can be concentrated on particular regions in an image. If the particular regions are off the ground plane, it significantly affects RANSAC estimation due to the outlier correspondences. Additionally, the output homography mapping is only good for those high density regions and does not work for other regions. Thus, according to the principles of the present invention, the number of feature correspondences on each sub-region of an image is limited to avoid these issues (element 104).

If the maximum number of feature correspondences is limited on any sub-region to avoid too many correspondences on particular regions, the homography mapping from this un-biased RANSAC can be more precise. In order to do this a pre-processing step of sub-region feature correspondence limitation is implemented. If any sub-region in an image has a relatively large number of feature correspondences compared with the total number, then the features in that sub-region are limited up to the average number of feature correspondences of all the sub-regions. That is, the number of feature correspondences is reduced to the average count.

The average number of feature correspondences over all of the sub-regions, k, is determined according to the following:

$$k = \frac{1}{N} \sum_{i=1}^{l} n_i,$$

where N is equal to the total number of feature correspondences, $n_i$ is the number of feature correspondences on an $i^{th}$ sub-region, and l is the total number of sub-regions.

If $n_i/N > T, i=1 \ldots l$, where T is a threshold of the ratio of $n_i$ to N, then randomly select $C_k^n$ (i.e., select k feature correspondences from the original n correspondences). In other words, if the ratio of $n_i$ to N is greater than the threshold T, then only k feature correspondences randomly selected from the original $n_i$ correspondences are used. As a non-limiting example, the threshold T is the average number of feature correspondences of all the sub-regions in the image. As can be appreciated by one skilled in the art, the threshold T could also be set as any determined threshold value.

Figure 3:
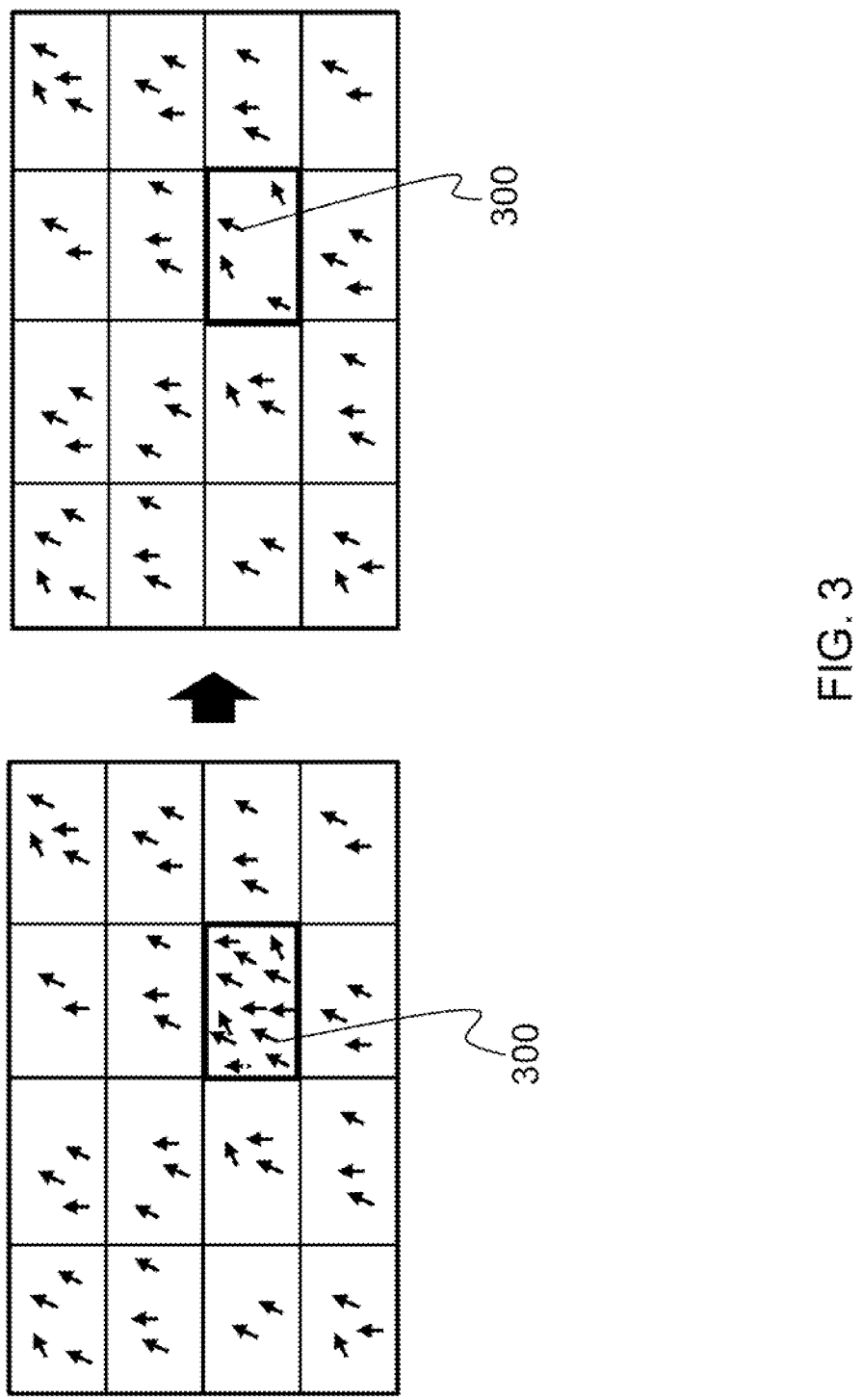
FIG. 3 illustrates a sub-region feature correspondence limit according to the principles of the present invention.

FIG. 3 illustrates sub-region division and feature correspondence limit in an Image. On the left-hand side, the sub-region in the third column and third row (surrounded by a bold outline) is selected as an example because it has more feature vectors 300 than the other sub-regions. Therefore, according to the principles of the present invention, the sub-region feature correspondence limit function performs random selection up to the average number of feature vectors 300. In this case, the average number of feature vectors 300 is 3.5, so the number of feature correspondences on that particular region is reduced to four feature vectors 300 (right-hand side) from twelve feature vectors 300 (left-hand side). The determination of the average number of feature correspondences over a set of the sub-regions is described above. Therefore, each sub-region will have roughly the average number of feature correspondences so that no particular region can significantly affect homography estimation. After feature exclusion of moving and above-ground objects and the sub-region feature correspondence limit methods have been used to process the image, a homography function can be estimated from feature correspondences by a model fitting algorithm, such as RANSAC. As a non-limiting example, the homography function will use an image registration by perspective transformation.

The present invention will benefit any application that uses planar homography. The robust homography estimation process according to the principles of the present invention is a critical component of many computer vision systems for intelligence, surveillance, reconnaissance (ISR), unmanned aerial vehicle (UAV) surveillance, border protection, active safety and collision avoidance, and automated driving. Additionally, it can play a critical role as a reusable core engine of a larger software project.

Figure 4:
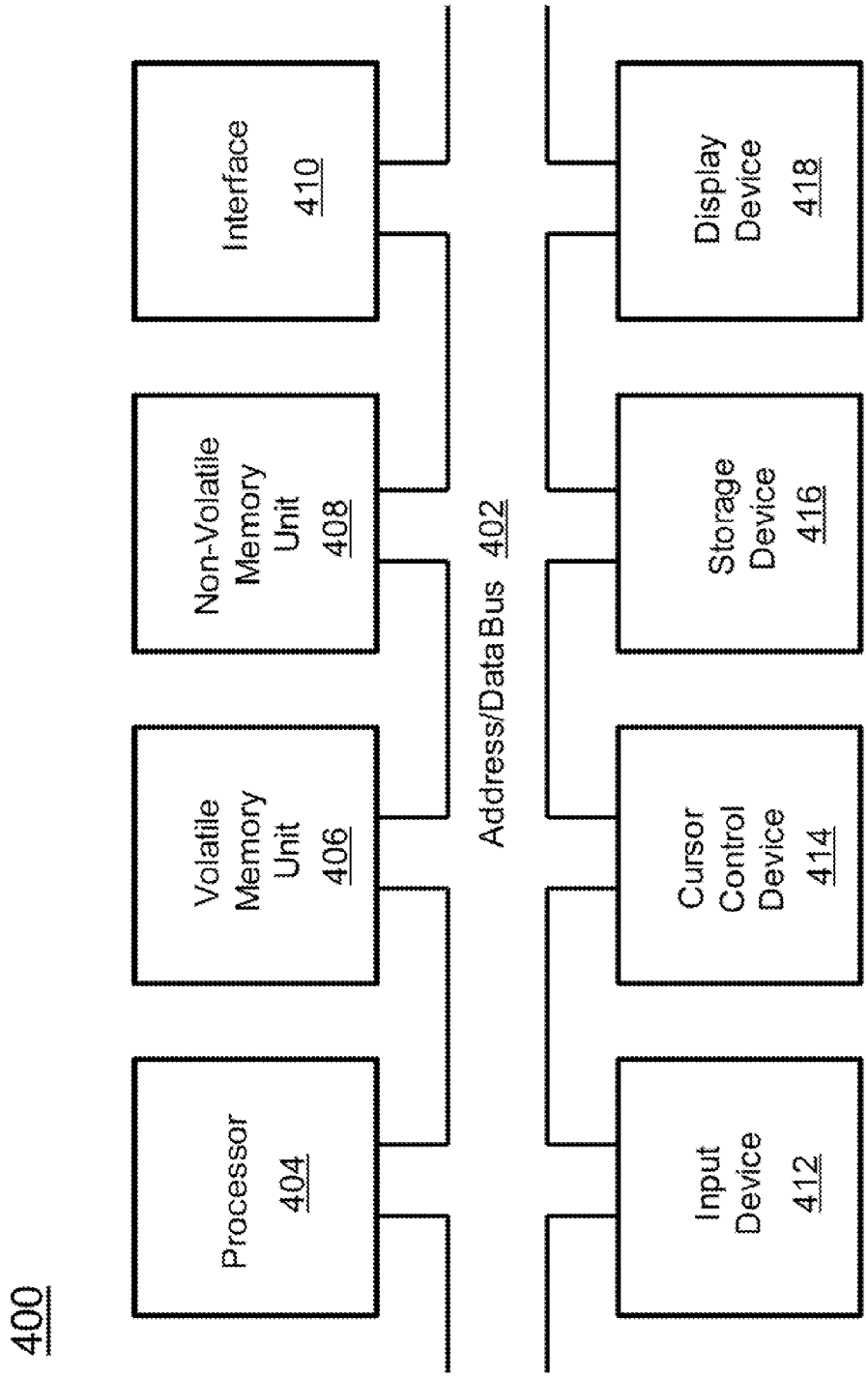
FIG. 4 is an illustration of a data processing system according to the principles of the present invention.

An example of a computer system 400 in accordance with one aspect is shown in FIG. 4. The computer system 400 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 400. When executed, the instructions cause the computer system 400 to perform specific actions and exhibit specific behavior, such as described herein.

The computer system 400 may include an address/data bus 402 that is configured to communicate information. Additionally, one or more data processing units, such as a processor 404, are coupled with the address/data bus 402. The processor 404 is configured to process information and instructions. In one aspect, the processor 404 is a microprocessor. Alternatively, the processor 404 may be a different type of processor such as a parallel processor, or a field programmable gate array.

The computer system 400 is configured to utilize one or more data storage units. The computer system 400 may include a volatile memory unit 406 (e.g., random access memory ("RAM"), static RAM, dynamic RAM, etc.) coupled with the address/data bus 402, wherein a volatile memory unit 406 is configured to store information and instructions for the processor 404. The computer system 400 further may include a non-volatile memory unit 408 (e.g., read-only memory ("ROM"), programmable ROM ("PROM"), erasable programmable ROM ("EPROM"), electrically erasable programmable ROM "EEPROM"), flash memory, etc.) coupled with the address/data bus 402, wherein the non-volatile memory unit 408 is configured to store static information and instructions for the processor 404. Alternatively, the computer system 400 may execute instructions retrieved from an online data storage unit such as in "Cloud" computing. In an embodiment, the computer system 400 also may include one or more interfaces, such as an interface 410, coupled with the address/data bus 402. The one or more interfaces are configured to enable the computer system 400 to interface with other electronic devices and computer systems. The communication interfaces implemented by the one or more interfaces may include wireline (e.g., serial cables, modems, network adaptors, etc.) and/or wireless (e.g, wireless modems, wireless network adaptors, etc.) communication technology.

In one aspect, the computer system 400 may include an input device 412 coupled with the address/data bus 402, wherein the input device 412 is configured to communicate information and command selections to the processor 400. In accordance with one aspect, the input device 412 is an alphanumeric input device, such as a keyboard, that may include alphanumeric and/or function keys. Alternatively, the input device 412 may be an input device other than an alphanumeric input device. In one aspect, the computer system 400 may include a cursor control device 414 coupled with the address/data bus 402, wherein the cursor control device 414 is configured to communicate user input information and/or command selections to the processor 400. In one aspect, the cursor control device 414 is implemented using a device such as a mouse, a track-ball, a track-pad, an optical tracking device, or a touch screen. The foregoing notwithstanding, in one aspect, the cursor control device 414 is directed and/or activated via input from the input device 412, such as in response to the use of special keys and key sequence commands associated with the input device 412. In an alternative aspect, the cursor control device 414 is configured to be directed or guided by voice commands.

In one aspect, the computer system 400 further may include one or more optional computer usable data storage devices, such as a storage device 416, coupled with the address/data bus 402. The storage device 416 is configured to store information and/or computer executable instructions. In one aspect, the storage device 416 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 418 is coupled with the address/data bus 402, wherein the display device 418 is configured to display video and/or graphics. In one aspect, the display device 418 may include a cathode ray tube ("CRT"), liquid crystal display ("LCD") field emission display ("FED"), plasma display, or an other display device suitable for displaying video and/or graphic images and alphanumeric characters recognizable to a user.

The computer system 400 presented herein is an example computing environment in accordance with one aspect. However, the non-limiting example of the computer system 400 is not strictly limited to being a computer system. For example, one aspect provides that the computer system 400 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 5:
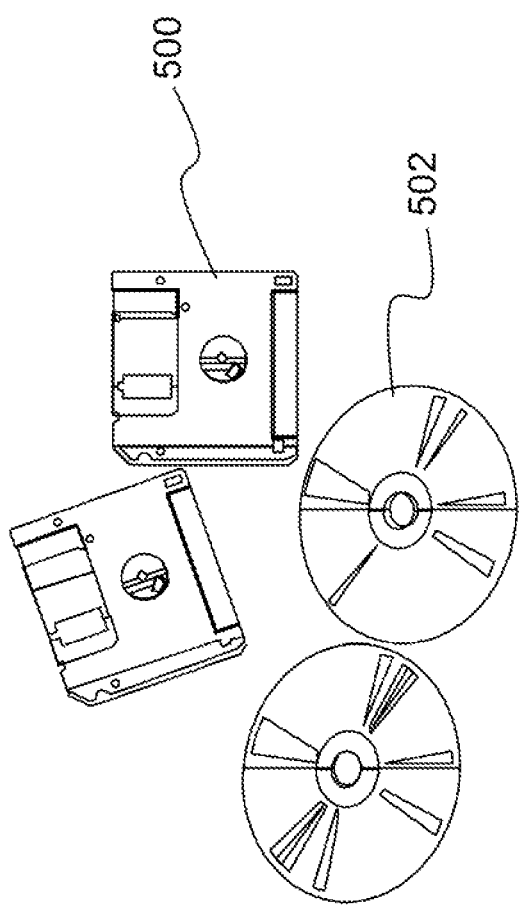
FIG. 5 is an illustration of a computer program product according to the principles of the present invention.

An illustrative diagram of a computer program product embodying an aspect of the present invention is depicted in FIG. 5. As a non-limiting example, the computer program product is depicted as either a floppy disk 500 or an optical disk 502. However, as mentioned previously, the computer program product generally represents computer readable code (i.e., instruction means or instructions) stored on any compatible non-transitory computer readable medium.

What is claimed is:

1. A system for homography estimation, the system comprising one or more processors and a non-transitory computer-readable medium having executable instructions encoded thereon such that when the instructions are executed, the one or more processors perform operations of:
   determining feature correspondences that correspond with at least one moving object in each image in a set of images;
   determining feature correspondences that correspond with at least one above-ground object in each image in the set of images;
   excluding feature correspondences that correspond with each moving object in each image in the set of images;
   excluding feature correspondences that correspond with each above-ground object in each image in the set of images;
   dividing each image in the set of images into a plurality of sub-regions comprising feature correspondences;
   limiting the number of feature correspondences in each sub-region to a predetermined threshold to ensure that feature correspondences are evenly distributed over each image in the set of images; and
   generating a ground-plane homography estimation between the set of images by excluding the feature correspondences that correspond with moving and above-ground objects in the set of images and limiting the number of feature correspondences in each sub-region to ensure that feature correspondences are evenly distributed over each image in the set of images.

2. The system as set forth in claim 1, wherein the one or more processors further performs an operation of limiting the number of feature correspondences in each sub-region to an average, number of feature correspondences of all sub-regions of the image.

3. The system as set forth in claim 2, wherein the one or more processors further performs an operation of determining the average number of feature correspondences of all sub-regions of the image, k, according to the following:

$$k = \frac{1}{N}\sum_{i=1}^{l} n_i,$$

where N denotes the total number of feature correspondences in the image, $n_i$ denotes the number of feature correspondences on an $i^{th}$ sub-region, l is the total number of sub-regions in the image, and $\Sigma$ denotes a summation.

4. The system as set forth in claim 3, wherein if the ratio of $n_i$ to N is greater than the predetermined threshold, then k feature correspondences are randomly selected from the number of feature correspondences on the $i^{th}$ sub-region for generating the ground-plane homography estimation between the images.

5. A computer-implemented method for homography estimation, comprising an act of causing a data processor to execute instructions stored on a non-transitory memory such that upon execution, the data processor performs operations of:
   determining feature correspondences that correspond with at least one moving object in each image in a set of images;
   determining feature correspondences that correspond with at least one above-ground object in each image in the set of images;
   excluding feature correspondences that correspond with each moving object in each image in the set of images;
   excluding feature correspondences that correspond with each above-ground object in each image in the set of images;
   dividing each image in the set of images into a plurality of sub-regions comprising feature correspondences;
   limiting. the number of feature correspondences in each sub-region to a predetermined threshold to ensure that feature correspondences are evenly distributed over each image in the set of images; and
   generating a ground-plane homography estimation between the set of images by excluding the feature correspondences that correspond with moving and above-ground objects in the set of images and limiting the number of feature correspondences in each sub-region to ensure that feature correspondences are evenly distributed over each image in the set of images.

6. The method as set forth in claim 5, wherein the data processor further performs an operation of limiting the number of feature correspondences in each sub-region to an average number of feature correspondences of all sub-regions of the image.

7. The method as set forth in claim 6, wherein the data processor further performs an operation of determining the average number of feature correspondences of all sub-regions of the image, k, according to the following:

$$k = \frac{1}{N}\sum_{i=1}^{l} n_i,$$

where N denotes the total number of feature correspondences in the image, $n_i$ denotes the number of feature correspondences on an $i^{th}$ sub-region, l is the total number of sub-regions in the image, and $\Sigma$ denotes a summation.

8. The method as set forth in claim 7, wherein if the ratio of $n_i$ to N is greater than the predetermined threshold, then k feature correspondences are randomly selected from the number of feature correspondences on the $i^{th}$ sub-region for generating the ground-plane homography estimation between the images.

9. A computer program product for homography estimation, the computer program product comprising computer-readable instructions stored on a non-transitory computer-readable medium that are executable by a computer having a processor for causing the processor to perform operations of:

determining feature correspondences that correspond with at least one moving object in each image in a set of images;

determining feature correspondences that correspond with at least one above-ground object in each image in the set of images;

excluding feature correspondences that correspond with each moving object in each image in the set of images;

excluding feature correspondences that correspond with each above-ground object in each image in the set of images;

dividing, each image in the set of images into a plurality of sub-regions comprising feature correspondences;

limiting the number of feature correspondences in each sub-region to a predetermined threshold to ensure that feature correspondences are evenly distributed over each image in the set of images; and generating a ground-plane homography estimation between the set of images by excluding the feature correspondences that correspond with moving and above-ground objects in the set of images and limiting the number of feature correspondences in each sub-region to ensure that feature correspondences are evenly distributed over each image in the set of images.

10. The computer program product as set forth in claim 9, further comprising instructions for causing the processor to perform an operation of limiting the number of feature correspondences in each sub-region to an average number of feature correspondences of all sub-regions of the image.

11. The computer program product as set forth in claim 10, further comprising instructions for causing the processor to perform an operation of determining the average number of feature correspondences of all sub-regions of the image, k, according to the following:

$$k = \frac{1}{N}\sum_{i=1}^{l} n_i,$$

where N denotes the total number of feature correspondences in the image, $n_i$ denotes the number of feature correspondences on an $i^{th}$ sub-region, l is the total number of sub-regions in the image, and $\Sigma$ denotes a summation.

12. The computer program product as set forth in claim 11, wherein if the ratio of $n_i$ to N is greater than the predetermined threshold, then k feature correspondences are randomly selected from the number of feature correspondences on the $i^{th}$ sub-region for generating the ground-plane homography estimation between the images.

* * * * *